US006797378B2

(12) United States Patent
Shimizu

(10) Patent No.: US 6,797,378 B2
(45) Date of Patent: Sep. 28, 2004

(54) ORGANIC FIBER FILLER-CONTAINING POLYPROPYLENE RESIN COMPOSITION AND MOLDED ARTICLE USING THE SAME

(75) Inventor: Ken Shimizu, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 178 days.

(21) Appl. No.: 10/053,125

(22) Filed: Jan. 17, 2002

(65) Prior Publication Data

US 2002/0173583 A1 Nov. 21, 2002

(30) Foreign Application Priority Data

Apr. 4, 2001 (JP) ........................................ 2001-105924

(51) Int. Cl.$^7$ ................................................. C08K 4/40
(52) U.S. Cl. ....................... 428/394; 428/374; 428/369; 525/240; 524/451; 524/515
(58) Field of Search ................................ 428/394, 374, 428/369, 332, 337, 458, 461, 464; 525/240, 57, 66, 68, 74, 80, 92; 524/451, 515, 34, 449, 456, 514, 505

(56) References Cited

U.S. PATENT DOCUMENTS 4,752,526 A * 6/1988 Daimon et al. ............. 428/332
5,145,891 A * 9/1992 Yasukawa et al. ............ 524/34

FOREIGN PATENT DOCUMENTS

EP          0 864 589 A2     2/1996

* cited by examiner

Primary Examiner—Robert D. Harlan
(74) Attorney, Agent, or Firm—J. C. Patents

(57) ABSTRACT

Provided are an organic fiber filler-containing polypropylene resin composition providing an article which is excellent in a moldability and a strength and an article obtained from the same. The organic fiber filler-containing polypropylene resin composition comprises a polypropylene resin satisfying the following equation and an organic fiber filler in a proportion of 1 to 250 parts by weight of the filler per 100 parts by weight of the resin composition:

$$\log MT > 4.24 \times \log [\eta] - 1.2 \qquad (1)$$

wherein MT represents a melt tension (unit: cN) of the polypropylene resin at 230° C., and $[\eta]$ represents a intrinsic viscosity (unit: dl/g) of the polypropylene resin measured in tetralin at 135° C.

4 Claims, No Drawings

ORGANIC FIBER FILLER-CONTAINING POLYPROPYLENE RESIN COMPOSITION AND MOLDED ARTICLE USING THE SAME

TECHNICAL FIELD

The present invention relates to a polypropylene resin composition containing an organic fiber filler and an article obtained from the same, more specifically to an organic fiber filler-containing polypropylene resin composition providing an article which is excellent in a moldability and a strength and an article obtained from the same.

RELATED ART

A large number of trials to blend a polypropylene resin with an organic fiber filler for the purposes of improving a rigidity, a molding contraction property, a heat resistance and a coating property of the above resin has so far been made.

However, polypropylene resins have a low melt viscosity, so that it has been difficult to obtain desired shapes even with the resins blended with organic fiber fillers by a profile extrusion molding method, an extrusion sheet molding method and a calender molding method. To be specific, under the situation that a tensile stress is applied in a melting state in blending a polypropylene resin with an organic fiber filler and extruding the molten resin in the form of a strand to pelletize it or in passing an organic fiber filler-blended polypropylene resin through a sizer such as a sizing plate when profile-extruding the resin or in extruding the resin in the form of a sheet to mold it by means of a roller, the phenomenon that the above organic fiber filler-blended polypropylene resin is torn off takes place.

In order to elevate a melt viscosity of a polypropylene resin, proposed are methods in which polypropylene is reduced into a high polymer and in which added is a processability-improving agent such as an elastomer and polyethylene, but the tearing-off phenomenon described above has not yet come to be solved.

A molded foam article obtained by foam-molding an organic fiber filler-blended polypropylene resin is very fragile and has the defect that it is liable to be cracked when it is subjected to after-working such as nailing. A reason therefor is estimated to be that because of a low melt viscosity of the polypropylene resin, a shape and a size of the foamed cell become unequal when foam-molded, which results in a reduction in a strength of the molded foam article. Because of these reasons, an organic fiber filler-containing polypropylene resin has not yet come to be sufficiently put to practical use.

DISCLOSURE OF THE INVENTION

The present invention has been made in light of the existing situation described above related to an organic fiber filler-containing polypropylene resin composition, and an object of the present invention is to solve the existing problems described above. That is, an object of the present invention is to provide an organic fiber filler-containing polypropylene resin composition providing a molded article which is excellent in a moldability and a strength and a molded article obtained from the same.

Intensive investigations repeated by the present inventors in order to solve the problems described above related to an organic fiber filler-containing polypropylene resin composition have resulted in finding that the foregoing problems related to an organic fiber filler-containing polypropylene resin composition can be solved by using a polypropylene resin having a specific relation between a melt tension and a intrinsic viscosity as the polypropylene resin in the organic fiber filler-containing polypropylene resin composition, and they have come to complete the present invention based on this knowledge.

That is, the present invention is composed of the following.

(1) An organic fiber filler-containing polypropylene resin composition comprising a polypropylene resin satisfying the following equation and an organic fiber filler in a proportion of 1 to 250 parts by weight of the filler per 100 parts by weight of the resin composition:

$$\log MT > 4.24 \times \log [\eta] - 1.2 \quad (1)$$

wherein MT represents a melt tension (unit: cN) of the polypropylene resin at 230° C., and $[\eta]$ represents a intrinsic viscosity (unit: dl/g) of the polypropylene resin measured in tetralin at 135° C.

(2) The organic fiber filler-containing polypropylene resin composition as described in the above item (1), wherein the polypropylene resin is an olefin polymer composition (A) described below or a mixture comprising the above olefin polymer composition (A) and a polypropylene base resin (B) described below, and a mixing proportion of the above polypropylene base resin (B) is 90% by weight or less based on the mixture: the olefin polymer composition (A): an olefin polymer composition comprising (a) and (b) described below:

(a) 0.01 to 5.0 parts by weight of polyethylene which is an ethylene homopolymer or an ethylene-olefin copolymer having an ethylene polymer unit of 50% by weight or more and which has a intrinsic viscosity $[\eta E]$ falling in a range of 15 to 100 dl/g measured in tetralin at 135° C., and (b) 100 parts by weight of polypropylene which comprises a propylene homopolymer or a propylene-olefin copolymer having a propylene polymer unit of 50% by weight or more and which has a intrinsic viscosity $[\eta P]$ of 0.2 to 10 dl/g measured in tetralin at 135° C.; and the polypropylene base resin (B): a propylene homopolymer or a propylene/α-olefin copolymer comprising propylene as a principal component.

(3) The organic fiber filler-containing polypropylene resin composition as described in the above item (1) or (2), further comprising a foaming agent.

(4) A molded article obtained by extrusion-molding the organic fiber filler-containing polypropylene resin composition as described in any of the above items (1) to (3).

EMBODIMENT OF THE INVENTION

The polypropylene resin used in the present invention is a polypropylene resin having the following characteristic:

$$\log MT > 4.24 \times \log [\eta] - 1.2 \quad (1)$$

wherein MT represents a melt tension (unit: cN) of the polypropylene resin at 230° C., and $[\eta]$ represents a intrinsic viscosity (unit: dl/g) of the polypropylene resin measured in tetralin at 135° C.

If the melt tension and the intrinsic viscosity fall in the ranges of values satisfying the equation (1) described above, capable of being avoided is the phenomenon that the molten resin is torn off in extruding the organic fiber filler-containing polypropylene resin composition.

The melt tension is a tension (unit: cN) observed when a strand obtained by extruding the resin molten by heating at 230° C. from an orifice having a diameter of 2.095 mm and a length of 40 mm at a speed of 20 mm/minute is received at a speed of 3.14 m/minute by means of a melt tension tester model 2 (manufactured by Toyo Seiki Mfg. Co., Ltd.). The intrinsic viscosity ($[\eta]$) is a value (unit: dl/g) measured on a temperature condition of 135° C. by means of an automatic viscosity-measuring instrument (AVS model 2 manufactured by Mitsui Toatsu Chemical Co., Ltd.) using tetralin as a solvent.

The polypropylene resin used in the present invention is preferably the olefin polymer composition (A) having the following characteristic:

the olefin polymer composition (A): an olefin polymer composition comprising (a) and (b) described below:

(a) 0.01 to 5.0 parts by weight of polyethylene which is an ethylene homopolymer or an ethylene-olefin copolymer having an ethylene polymer unit of 50% by weight or more and which has a intrinsic viscosity $[\eta E]$ falling in a range of 15 to 100 dl/g measured in tetralin at 135° C., and (b) 100 parts by weight of polypropylene which comprises a propylene homopolymer or a propylene-olefin copolymer having a propylene polymer unit of 50% by weight or more and which has a intrinsic viscosity $[\eta P]$ of 0.2 to 10 dl/g measured in tetralin at 135° C.

A method for obtaining such olefin polymer composition (A) shall not specifically be restricted, and it can be prepared, for example, by a method disclosed in International Publication No. WO97/14725, that is, a two-stage polymerization method in which a prescribed amount of high molecular weight polyethylene having a intrinsic viscosity $[\eta E]$ falling in a range of 15 to 100 dl/g is polymerized using a catalyst for polymerizing olefin obtained by combining a carrying type titanium-containing solid catalyst component with an organic aluminum compound and in which a prescribed amount of polypropylene having a intrinsic viscosity $[\eta P]$ of 0.2 to 10 dl/g is then polymerized. The olefin polymer composition (A) thus obtained satisfies the relation between the melt tension and the melt viscosity in the equation (1) described above.

The intrinsic viscosity ($[\eta]$) is a value measured on a temperature condition of 135° C. by means of the automatic viscosity-measuring instrument (AVS model 2 manufactured by Mitsui Toatsu Chemical Co., Ltd.) using tetralin as a solvent.

The olefin polymer composition (A) is preferably used alone as a polypropylene resin but can be used as well in the form of a polypropylene resin mixed with the polypropylene base resin (B) other than the olefin polymer composition (A) in the range satisfying the relation between the melt tension and the melt viscosity of the polypropylene resin finally obtained in the equation (1) described above. In using the olefin polymer composition (A) mixed with the polypropylene base resin (B), a mixing proportion of the above polypropylene base resin (B) is 90% by weight or less, preferably 20 to 80% by weight and more preferably 30 to 70% by weight based on the mixture. In this case, the polypropylene base resin (B) may be either one of a propylene homopolymer and a propylene/α-olefin copolymer comprising propylene as a principal component or a mixture of two or more kinds thereof. In this connection, the term of the principal component means a component having the largest content in the copolymer.

A method for mixing the olefin polymer composition (A) described above with the polypropylene base resin (B) shall not specifically be restricted, and capable of being used is a method using a mixing equipment usually used for mixing polypropylene, such as a Henschel mixer (brand name), a super mixer and a tumbler mixer. The resulting mixture may be molten and kneaded by means of a roll or an extruding machine to be pelletized. In this case, capable of being added are various additives, for example, antioxidants, heat stabilizers, light stabilizers, antistatic agents, colorants, dispersants, flame retardants and the like.

The organic fiber filler used in the present invention includes powdered materials such as wood powder, wood chip, coconut shell, chaff, coffee residue, pulp, sugar cane stem residue powder, cob, kenaf, powder of hemp dusts, peat-moss and giant kelp, vegetable fibrous fillers comprising cellulose as a principal component such as those obtained by powdering or flaking waste papers, for example, news papers, magazines and corrugated fiberboards, cotton yarns, cotton cloths, hemp cloths and rayon-made nonwoven fabric waste pieces, synthetic fibers such as PET and PA and mixtures of two or more kinds thereof. Among them, preferred ones include wood powder, wood chip, chaff or mixtures of two or more kinds thereof.

A particle size of these organic fiber fillers shall not specifically be restricted, and in the case of wood powder in which a particle size is usually shown by mesh, it is preferably finer than 10 mesh. Further, in the case of other vegetable fibrous fillers and synthetic fibers, those having a length of 0.1 to 5.0 mm and a thickness of 0.1 to 2.0 mm are preferred considering a reinforcing effect for the resin and easiness in mixing.

Further, in the case where these organic fiber fillers are reused products of plywoods, that is, recycled products, thermosetting resins and adhesives may be adhered to the fibers of the above recycled products.

These organic fiber fillers may be treated in advance or by after-addition with a wax, a surfactant or a coupling agent as a surface treating agent for the organic fiber filler.

The organic fiber filler-containing polypropylene resin composition of the present invention can usually be blended with an inorganic filler of 80% by weight or less, preferably 5 to 30% by weight based on the composition as long as the molding processability is not damaged. Capable of being give as the examples of the inorganic filler are talc, clay, silica, calcium carbonate, alumina, zeolite, barium sulfate, titanium oxide and glass fiber.

Further, the organic fiber filler-containing polypropylene resin composition of the present invention can be blended with a high molecular modifier as long as the molding processability and the physical properties are not damaged. The high molecular modifier includes maleic acid-modified polypropylene, ethylene base resins such as high density polyethylene, medium density polyethylene, low density polyethylene, liners low density polyethylene and ethylene-vinyl acetate copolymers, syndiotactic polypropylene resins, butene base resins, cyclic olefin base resins, petroleum resins, styrene base resins, acryl base resins, fluororesins, polyolefin base rubbers such as ethylene-propylene copolymer rubbers and ethylene-butene copolymer rubbers, polyamide resins and polyester resins. A blending proportion of these high molecular modifiers is 50 parts by weight at the maximum per 100 parts by weight of the organic fiber filler-containing polypropylene resin composition.

The organic fiber filler-containing polypropylene resin composition described above is further mixed with a foaming agent and molten and kneaded, and then a molded foam article can be produced by a publicly known extrusion-molding method or profile extrusion-molding method. The foaming agent is added in a proportion of 0.1 to 10 parts by weight per 100 parts by weight of the organic fiber filler-containing polypropylene resin composition.

Any of publicly known volatile type foaming agents and decomposing type foaming agents can be used as the foaming agent. Capable of being give as the examples of the volatile type foaming agents are aliphatic hydrocarbons such as propane and butane, alicyclic hydrocarbons such as cyclobutane, halogenated hydrocarbons such as chlorodifluoromethane, trifluoromethane, dichlorodifluoromethane, dichlorotrifluoroethane and dichloropentafluoroethane, inorganic gas such as carbon dioxide, nitrogen gas and air and water. Capable of being give as the examples of the decomposing type foaming agents are N,N'-dinitropentamethylenetetramine, azodicarbonamide, p,p'-oxybisbenzenesulfonylhydrazide, citric acid and sodium hydrogencarbonate.

In producing the organic fiber filler-containing polypropylene resin composition of the present invention, it is produced by adding the polypropylene resin satisfying the equation (1) described above, the organic fiber filler and, if necessary, various additives described above and melting, kneading and pelletizing them by means of a banbury mixer, a roll or an extruding machine. In this case, the melting and kneading temperature is 150 to 300° C., preferably 150 to 250° C.

Further, capable of being used as well are (1) a method in which the respective prescribed amounts of the polypropylene resin satisfying the equation (1) described above, the organic fiber filler and, if necessary, various additives described above are put in a mixing equipment such as a Henschel mixer (brand name) and stirred and mixed at a temperature at which the above polypropylene resin is not molten to prepare a mixture or (2) a method in which the respective prescribed amounts of the polypropylene resin satisfying the equation (1) described above, the organic fiber filler and, if necessary, various additives described above are put in a mixing equipment and heated at a temperature higher than a melting temperature of the above polypropylene resin to stir, melt and blend them and in which this molten mixture is then transferred into a stirring device for cooling and granulated while cooling. Further, this mixture or granulated matter is molten, kneaded and pelletized by means of a banbury mixer, a roll or an extruding machine, whereby the resin composition is prepared.

The pellet, mixture or granulated matter obtained by these methods is used for producing a molded article by a molding method such as an injection molding method, an extrusion molding method, a profile extrusion molding method and a compression molding method according to the purposes.

EXAMPLES

The present invention shall more specifically be explained below with reference to examples and comparative examples, but the present invention shall not be restricted to these examples.

Methods for measuring the physical properties used in the examples and the comparative examples are shown below.
Melt Tension: 0.1 part by weight of 2,6-di-t-butyl-p-cresol and 0.1 part by weight of calcium stearate were added to 100 parts by weight of the polymers obtained in the examples or the mixtures of the respective polymers excluding wood powder, and they were put into a high speed stirrer (Henschel mixer: brand name) and mixed for 2 minutes. The mixture was pelletized at 230° C. by means of an extrusion pelletizing machine having a bore of 40 mm to obtain pellets. The pellets thus obtained were heated and molten at 230° C. by means of a melt tension tester model 2 (manufactured by Toyo Seiki Mfg. Co., Ltd.) and extruded from an orifice having a diameter of 2.095 mm and a length of 40 mm at a speed of 20 mm/minute to obtain a strand, and the tension observed when receiving the strand at a speed of 3.14 m/minute was measured to obtain the melt tension (unit: cN).

Intrinsic Viscosity: measured on a temperature condition of 135° C. by means of an automatic viscosity-measuring instrument (AVS model 2 manufactured by Mitsui Toatsu Chemical Co., Ltd.) using tetralin as a solvent (unit: dl/g).

Izod Impact Strength: measured according to JIS K6758 (unit: KJ/m$^2$).

The blend components used in the examples and the comparative examples are shown below.

Olefin Polymer Composition (A): an olefin polymer composition (A) having a intrinsic viscosity [η] of 2.0 dl/g which is prepared by a two-stage polymerization method disclosed in International Publication No. WO97/14725 and which comprises (a) and (b) described below:

(a) 0.25 part by weight of a high molecular weight ethylene homopolymer having a intrinsic viscosity [ηE] of 31 dl/g, and (b) 100 parts by weight of a propylene homopolymer having a intrinsic viscosity [ηP] of 2.0 dl/g measured in tetralin at 135° C.

Polypropylene Base Resin (B): a propylene homopolymer having a intrinsic viscosity [η] of 2.0 dl/g.

Wood Powder: wood powder having a particle size of 80 mesh.

Examples 1 to 2 and Comparative Example 1

Wood powder having a particle size of 80 mesh and the olefin polymer composition (A) in which a melt tension and a intrinsic viscosity [η] satisfied the equation (1) described above or the polypropylene base resin (B) which were described as the polypropylene resin in Table 1 described later were put into a Henschel mixer (brand name) in a prescribed proportion, and 0.2 part by weight of 2,6-di-t-butyl-p-cresol and 0.1 part by weight of calcium stearate were further added to 100 parts by weight of the mixture thereof. They were stirred and mixed for 3 minutes and then molten, kneaded and extruded on the condition of a melting and kneading temperature of 210° C. by means of a vent-equipped single-screw extruding machine having a bore of 50 mm to obtain the pellets of a wood powder-containing resin composition. The resulting pellets were subjected to profile extrusion molding with a cross section of 80 mm×4 mm on the condition of 180° C. by means of a single-screw extruding machine having a bore of 50 mm and an L/D of 24. Molding was carried out at an air gap of 60 mm from an extruding mouthpiece to a sizing plate and a receiving speed of 0.6 m/minute. In this case, it was observed whether or not tearing-off was caused in the respective resin compositions.

A intrinsic viscosity and a melt tension of the polypropylene base resin composition excluding wood powder in the composition in Example 2 were measured by the following procedure.

Added to 100 parts by weight of the polypropylene base resin composition prepared by blending the olefin polymer composition (A) with the polypropylene base resin (B) in a weight proportion of 1:1 were 0.1 part by weight of 2,6-di-t-butyl-p-cresol and 0.1 part by weight of calcium stearate, and they were put into the high speed stirrer (Henschel mixer: brand name) and stirred for 2 minutes to obtain a mixture. Then, this mixture was molten, kneaded and extruded at 230° C. by means of an extruding machine having a bore of 40 mm to obtain pellets, and the pellets thus obtained were used for determining a intrinsic viscosity and a melt tension to result in finding that the intrinsic viscosity was 2.0 dl/g and the melt tension was 3.0.

Example 3 and Comparative Example 2

Wood powder having a particle size of 80 mesh and the olefin polymer composition (A) in which a melt tension and a intrinsic viscosity [η] satisfied the equation (1) described above or the polypropylene base resin (B) which were described as the polypropylene resin in Table 2 described later were put into the Henschel mixer (brand name) in a prescribed proportion, and 0.2 part by weight of 2,6-di-t-butyl-p-cresol and 0.1 part by weight of calcium stearate were further added to 100 parts by weight of the mixture thereof. They were stirred and mixed for 3 minutes and then molten, kneaded and extruded on the condition of a melting and kneading temperature of 210° C. by means of the vent-equipped single-screw extruding machine having a bore of 50 mm to obtain the pellets of a wood powder-containing resin composition. Added to 100 parts by weight of the resulting pellets was 2 parts by weight of citric acid, and the pellets were subjected to foaming, profile extrusion molding with a cross section of 80 mm×4 mm on the condition of 200 to 180° C. by means of the single-screw extruding machine having a bore of 50 mm and an L/D of 24. Molding was carried out at an air gap of 60 mm from an extruding mouthpiece to a sizing plate and a receiving speed of 0.5 m/minute. The molded article thus obtained was subjected to cutting work to prepare an Izod test piece based on the JIS standard and measure an Izod impact value.

Tearing-off was caused in foaming, profile extrusion molding in Comparative Example 2, and the sample obtained immediately before tearing-off was caused was subjected to cutting work to obtain an Izod test piece. The results thus obtained are described in Table 2.

Table 1
Table 2

EFFECTS OF THE INVENTION

As apparent from the data shown in Table 1 and Table 2, the organic fiber filler-containing polypropylene resin composition of the present invention is excellent in moldability without causing tearing-off in a melting state in extrusion molding and makes it possible to provide a good molded article having a high mechanical strength even in foam molding.

TABLE 1

|  |  | Example 1 | Example 2 | Comparative Example 1 |
|---|---|---|---|---|
| Olefin polymer composition (A) | [η] (dl/g) | 2.0 | 2.0 |  |
|  | Melt tension (cN) | 5.0 | 5.0 |  |
|  | Blending amount (weight %) | 50 | 25 |  |
| Polypropylene base resin (B) | [η] (dl/g) |  | 2.0 | 2.0 |
|  | Melt tension (cN) |  | 1.0 | 1.0 |
|  | Blending amount (weight %) |  | 25 | 50 |
| Wood powder | Blending amount (weight %) | 50 | 50 | 50 |
| Tearing off in extruding | Present or nothing | Nothing | Nothing | Present |

TABLE 2

|  |  | Example 3 | Comparative Example 2 |
|---|---|---|---|
| Olefin polymer composition (A) | [η] (dl/g) | 2.0 |  |
|  | Melt tension (cN) | 5.0 |  |
|  | Blending amount (weight %) | 50 |  |
| Polypropylene base resin (B) | [η] (dl/g) |  | 2.0 |
|  | Melt tension (cN) |  | 1.0 |
|  | Blending amount (weight %) |  | 25 |
| Wood powder | Blending amount (weight %) | 50 | 50 |
| Tearing off in extruding | Present or nothing | Nothing | Present |
| Izod impact value | KJ/m$^2$ | 2.5 | 2.0 |

What is claimed is:

1. An organic fiber filler-containing polypropylene resin composition comprising a polypropylene resin satisfying the following equation and an organic fiber filler in a proportion of 1 to 250 parts by weight of the filler per 100 parts by weight of the resin composition:

$$\log MT > 4.24 \times \log [\eta] - 1.2 \tag{1}$$

wherein MT represents a melt tension (unit: cN) of the polypropylene resin at 230° C., and [η] represents an intrinsic viscosity (unit: dl/g) of the polypropylene resin measured in tetralin at 135° C., and the polypropylene resin is an olefin polymer composition (A) described below or a mixture comprising the above olefin polymer composition (A) and a polypropylene base resin (B) described below, and a mixing proportion of the above polypropylene base resin (B) is 90% by weight or less based on the mixture:

the olefin polymer composition (A): an olefin polymer composition comprising a mixture of (a) and (b) described below:

(a) 0.01 to 5.0 parts by weight of polyethylene which is an ethylene homopolymer or an ethylene-olefin copolymer having an ethylene polymer unit of 50% by weight or more and which has an intrinsic viscosity [ηE] falling in a range of 15 to 100 dl/g measured in tetralin at 135°C., and (b) 100 parts by weight of polypropylene which comprises a propylene homopolymer or a propylene-olefin copolymer having a propylene polymer unit of 50% by weight or more and which has an intrinsic viscosity [ηP] of 0.2 to 10 dl/g measured in tetralin at 135°C.; and the polypropylene base resin (B): a propylene homopolymer or a propylene/α-olefin copolymer comprising propylene as a principal component.

2. The organic fiber filler-containing polypropylene resin composition as described in claim 1, further comprising a foaming agent.

3. A molded article obtained by extrusion-molding the organic fiber filler-containing polypropylene resin composition as described in claim 1.

4. A molded article obtained by extrusion-molding the organic fiber filler-containing polypropylene resin composition as described in claim 2.

* * * * *